(12) United States Patent
Kim et al.

(10) Patent No.: US 10,434,972 B2
(45) Date of Patent: Oct. 8, 2019

(54) AIR BAG DEVICE FOR DRIVER'S SEAT

(71) Applicant: HYUNDAI MOBIS CO., LTD., Seoul (KR)

(72) Inventors: Do Hyoung Kim, Yongin-si (KR); Hae Kwon Park, Yongin-si (KR); Seokhoon Ko, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 96 days.

(21) Appl. No.: 15/798,140

(22) Filed: Oct. 30, 2017

(65) Prior Publication Data
US 2018/0134245 A1   May 17, 2018

(30) Foreign Application Priority Data

Nov. 16, 2016   (KR) .......................... 10-2016-0152977

(51) Int. Cl.
| | | |
|---|---|---|
| *B60R 21/16* | (2006.01) | |
| *B60R 21/233* | (2006.01) | |
| *B60R 21/203* | (2006.01) | |
| *B60R 21/2338* | (2011.01) | |

(52) U.S. Cl.
CPC .......... *B60R 21/233* (2013.01); *B60R 21/203* (2013.01); *B60R 21/2338* (2013.01); *B60R 2021/23382* (2013.01)

(58) Field of Classification Search
CPC . B60R 21/203; B60R 21/2338; B60R 21/231; B60R 2021/23382

USPC ................................... 280/731, 743.1, 743.2
See application file for complete search history.

(56) References Cited

U.S. PATENT DOCUMENTS

| | | | | |
|---|---|---|---|---|
| 6,371,510 B1* | 4/2002 | Marriott | ................ | B60R 21/201 280/730.1 |
| 8,419,054 B2* | 4/2013 | Abe | .................... | B60R 21/2338 280/731 |
| 8,899,618 B2* | 12/2014 | Eckert | ................... | B60R 21/203 280/731 |
| 8,925,962 B2* | 1/2015 | Yamada | ................ | B60R 21/233 280/729 |
| 2003/0168842 A1* | 9/2003 | Igawa | ................... | B60R 21/233 280/743.2 |
| 2005/0206141 A1* | 9/2005 | Ishikawa | ............... | B60R 21/237 280/731 |
| 2006/0113776 A1* | 6/2006 | Iida | ........................ | B60R 21/233 280/731 |
| 2006/0197324 A1* | 9/2006 | Klinkenberger | ...... | B60R 21/203 280/731 |
| 2006/0232050 A1* | 10/2006 | Kumagai | .............. | B60R 21/231 280/730.1 |
| 2006/0249939 A1* | 11/2006 | Maripudi | .............. | B60R 21/233 280/740 |

(Continued)

*Primary Examiner* — Toan C To
(74) *Attorney, Agent, or Firm* — Knobbe Martens Olson & Bear LLP

(57) ABSTRACT

An air bag device for a driver's seat may include a main-cushion unit provided on a steering wheel and having a front chamber that comes into contact with the steering wheel and a rear chamber that faces a driver, a sub-cushion unit communicating with the main-cushion unit and protruding outwards from the main-cushion unit, and a guide chamber located in the main-cushion unit to define a passage for guiding gas produced in an inflator to the sub-cushion unit.

10 Claims, 5 Drawing Sheets

(56) References Cited

U.S. PATENT DOCUMENTS

2008/0048420 A1* 2/2008 Washino ............... B60R 21/203
                                                      280/731
2014/0375035 A1* 12/2014 Fukawatase .......... B60R 21/231
                                                      280/731

* cited by examiner

AIR BAG DEVICE FOR DRIVER'S SEAT

CROSS-REFERENCES TO RELATED APPLICATIONS

The present application claims priority to Korean application number 10-2016-0152977, filed on Nov. 16, 2016, which is incorporated by reference in its entirety.

BACKGROUND OF THE INVENTION

The present invention relates to an air bag device for a driver's seat, and more particularly, to an air bag device for a driver's seat, which has a cushion deployed between a steering wheel and a driver's chest in the event of a head-on collision of a vehicle, thus preventing a driver's injury.

In general, air bag systems of vehicles are devices that instantaneously inflate air bags in the event of a collision to reduce injuries due to impacts, separately from a seat belt for restraining a person.

Among the air bag systems, an air bag system for a driver is a device that instantaneously inflates an air bag between the driver and a steering wheel in the event of a vehicle collision to reduce injuries due to impacts.

The driver air bag for the vehicle is disposed in the steering wheel, and is deployed with gas generated by an inflator present in the air bag in the event of a head-on collision to protect a driver. The air bag is inflated by internal gas pressure, and quickly restrains a driver's head and chest, thus preventing the driver from coming into contact with the steering wheel and being injured.

Since a commercial vehicle is short in front overhang, a steering column may be excessively tilted up in the event of a head-on collision. While the air bag for the driver's seat is lifted simultaneously with the steering column, an injury to a driver's chest increases. As the steering column equipped with the air bag for the driver's seat is tilted up at 20 degrees or more, the air bag cushion is deployed towards an upper end of the steering wheel. Thus, the driver's chest and the steering wheel collide directly with each other, so that the driver's injury may be increased. Therefore, there is a need for solving these problems.

The related art of the present invention is disclosed in Korean Patent Laid-Open Publication No. 2007-0042262 published on Apr. 23, 2007 and entitled "Air bag cushion structure of driver's seat".

SUMMARY OF THE INVENTION

Embodiments of the present invention are directed to an air bag device for a driver's seat, which has a cushion deployed between a steering wheel and a driver's chest in the event of a head-on collision of a vehicle, thus preventing a driver's injury.

In one embodiment, an air bag device for a driver's seat may include a main-cushion unit provided on a steering wheel and having a front chamber that comes into contact with the steering wheel and a rear chamber that faces a driver, a sub-cushion unit communicating with the main-cushion unit and protruding outwards from the main-cushion unit, and a guide chamber located in the main-cushion unit to define a passage for guiding gas produced in an inflator to the sub-cushion unit.

The main-cushion unit may be deployed to an upper side of the steering wheel, and the sub-cushion unit may be deployed downwards from an edge of the main-cushion unit facing the driver to face an outer surface of the steering wheel.

The sub-cushion unit may include a sub-cushion body protruding outwards from the main-cushion unit and inflated by gas, a first passage located between the sub-cushion body and the guide chamber to define a passage for guiding gas that passes through the guide chamber to the sub-cushion body, and a second passage connecting the sub-cushion body with the main-cushion unit and guiding gas, which may flow to the sub-cushion body and may inflate the sub-cushion body, to the main-cushion unit.

The first passage may include a hole through which gas may flow in a shape of a membrane shielding an upper side of the sub-cushion body.

The second passage may be provided on each of both sides of the first passage.

The second passage may cover the upper side of the sub-cushion body, and may have a hole through which gas may flow.

The guide chamber may define a passage connecting the inflator with an inlet of the sub-cushion unit, and may be secured to the front chamber.

The guide chamber may include a discharge hole formed to supply gas to the main-cushion unit.

The guide chamber may be formed to be long in a vertical direction, and upper and lower portions of the guide chamber may have different lengths with respect to a horizontal central line of the steering wheel.

Furthermore, a chamber width that may be a width of the guide chamber may be less than a wheel width that may be a diameter of the steering wheel.

The air bag device may further include a tether part that may be formed in a shape of a band and may connect the front chamber with the rear chamber to guide deployment of the main-cushion unit in a preset shape.

The present invention provides an air bag device for a driver's seat, which is capable of preventing or reducing a driver's injury caused by contact between a driver and a steering wheel, due to a sub-cushion unit deployed between the steering wheel and a driver's chest in the event of a head-on collision of a vehicle.

The present invention provides an air bag device for a driver's seat, in which gas produced in an inflator flows through a guide chamber to primarily deploy a sub-cushion unit, and then flows to a main-cushion unit to secondarily deploy the main-cushion unit, thus preventing an injury from increasing while a driver's chest coming into contact with a steering wheel.

DESCRIPTION OF SPECIFIC EMBODIMENTS

Hereafter, an air bag device for a driver's seat in accordance with embodiments of the invention will be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
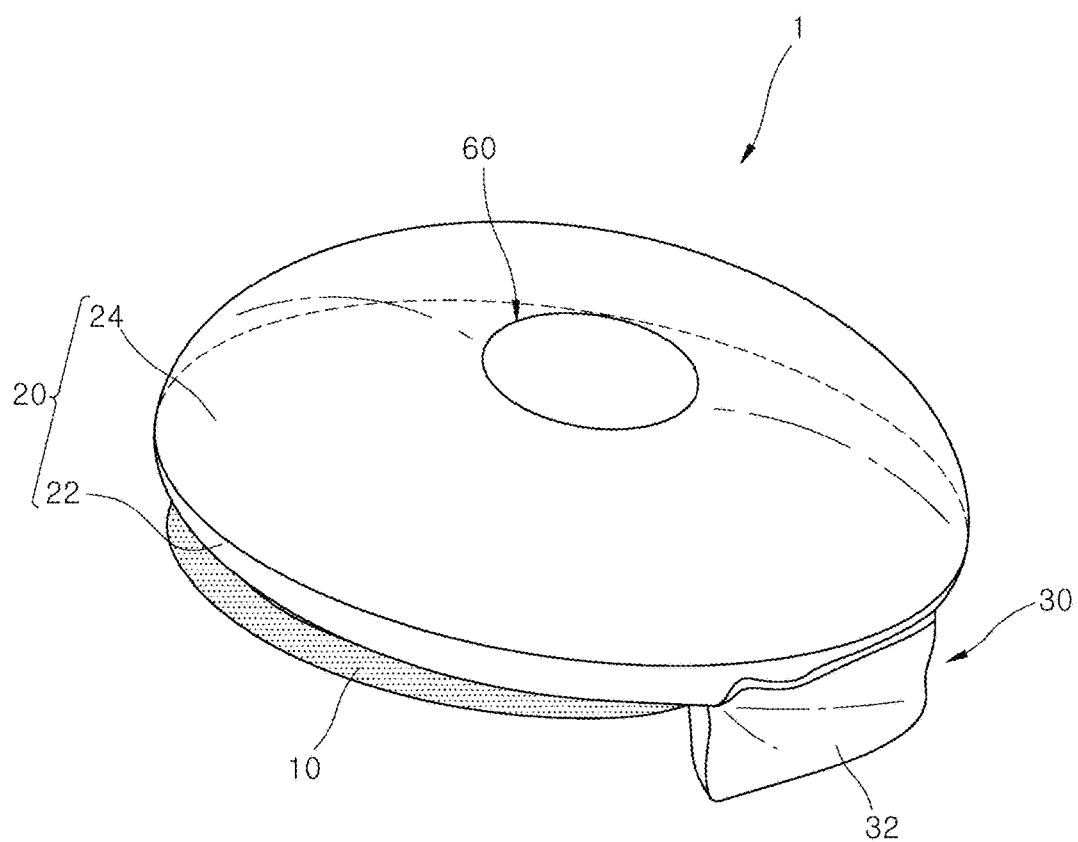
FIG. 1 is a perspective view schematically illustrating the appearance of an air bag device for a driver's seat in accordance with an embodiment of the present invention.
Figure 2:
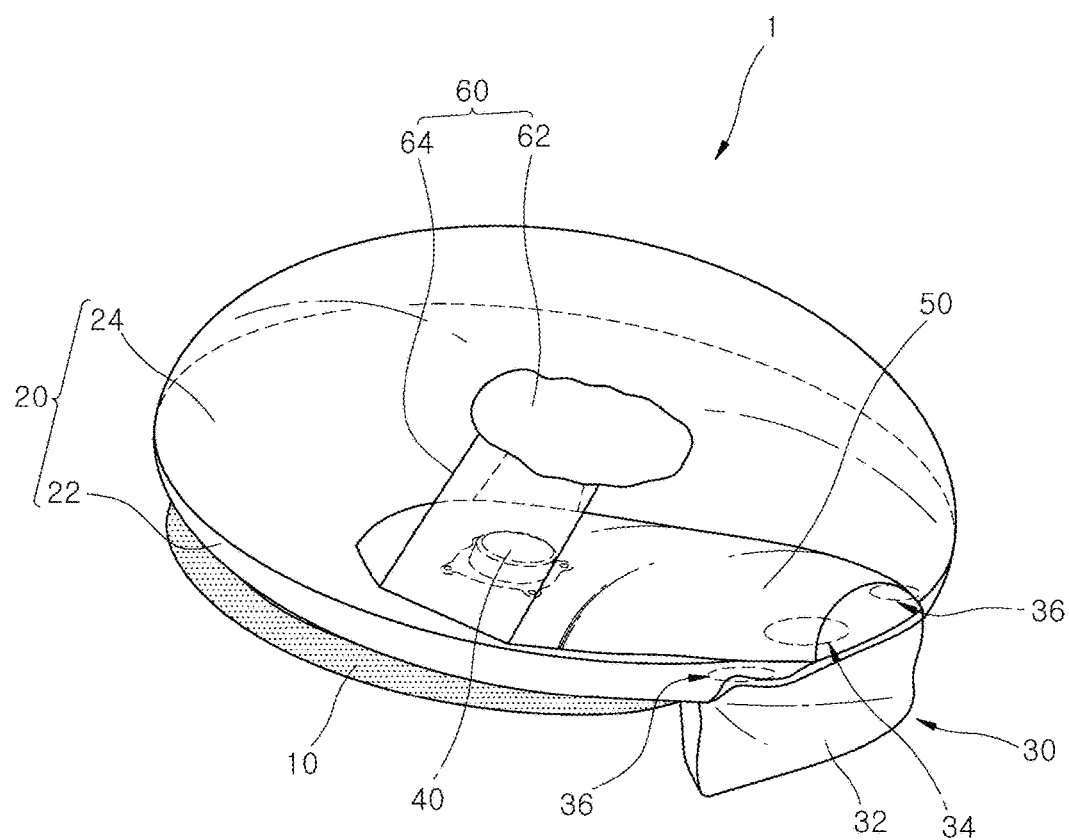
FIG. 2 is a view schematically illustrating the main configuration of the air bag device for the driver's seat in accordance with the embodiment of the present invention.
Figure 3:
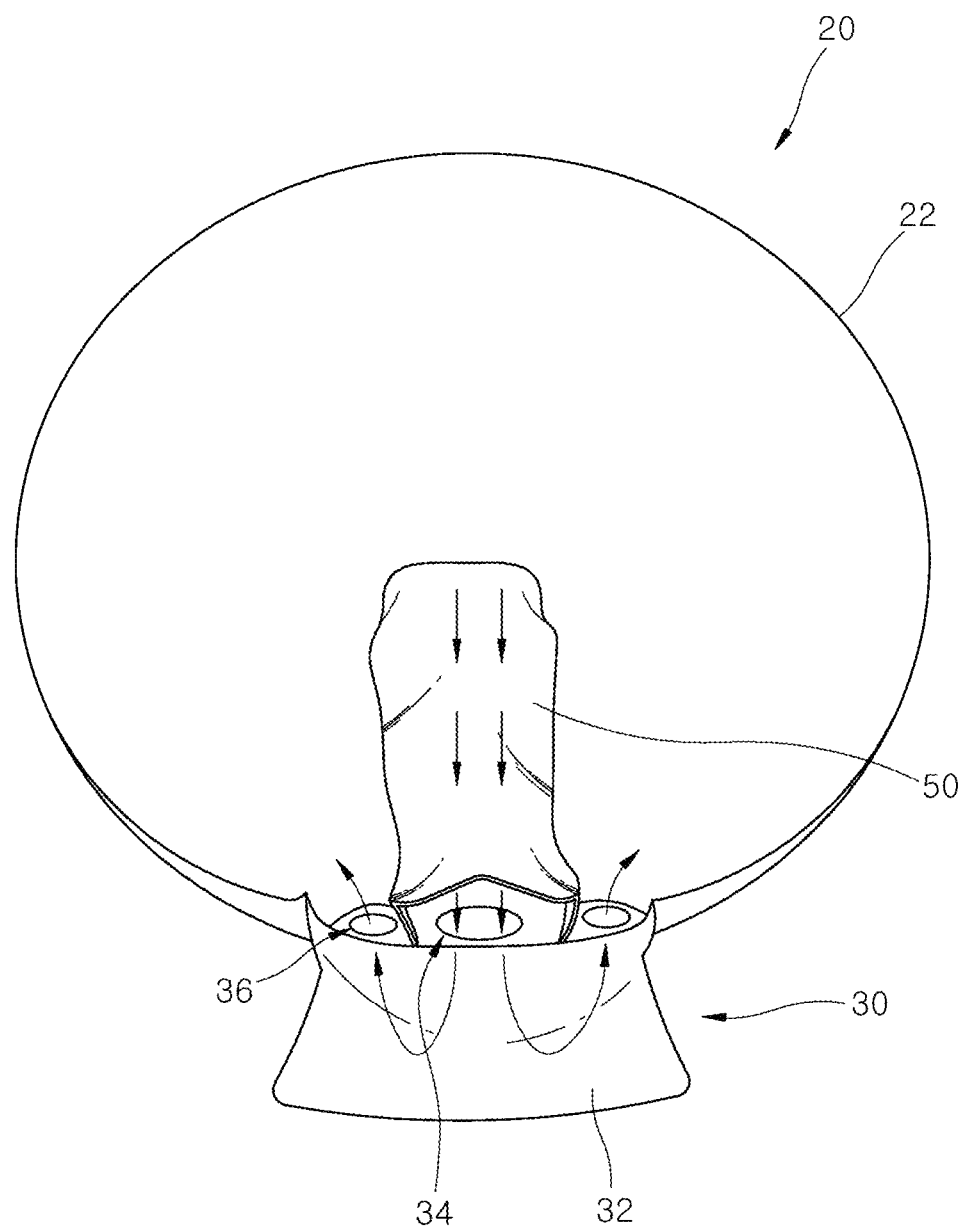
FIG. 3 is a view illustrating a connecting relation between a guide chamber and a sub-cushion unit in accordance with an embodiment of the present invention.
Figure 4:
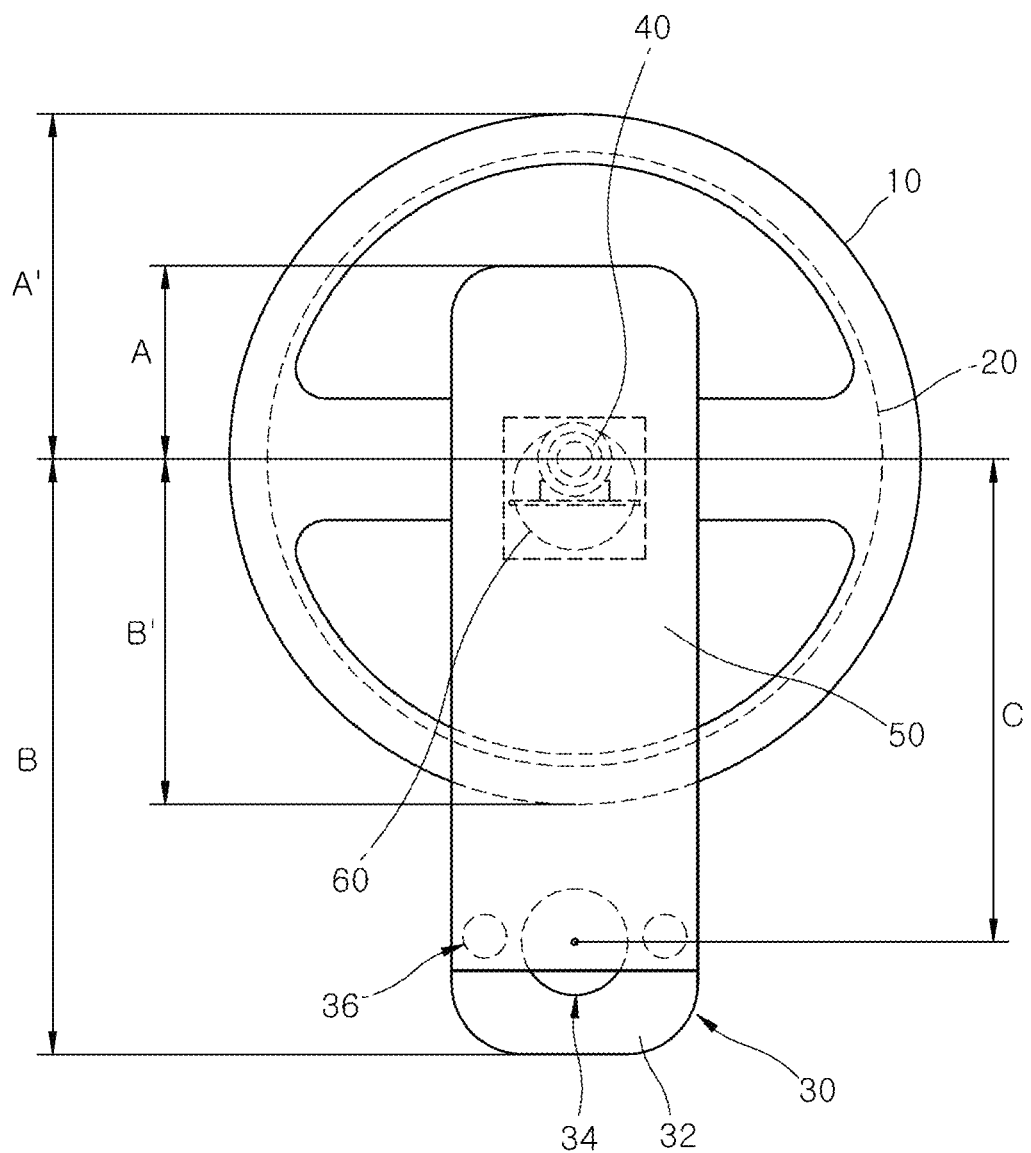
FIGS. 4 and 5 are plan views schematically illustrating a state before the guide chamber and the sub-cushion unit in accordance with the embodiment of the present invention are deployed.
Figure 5:
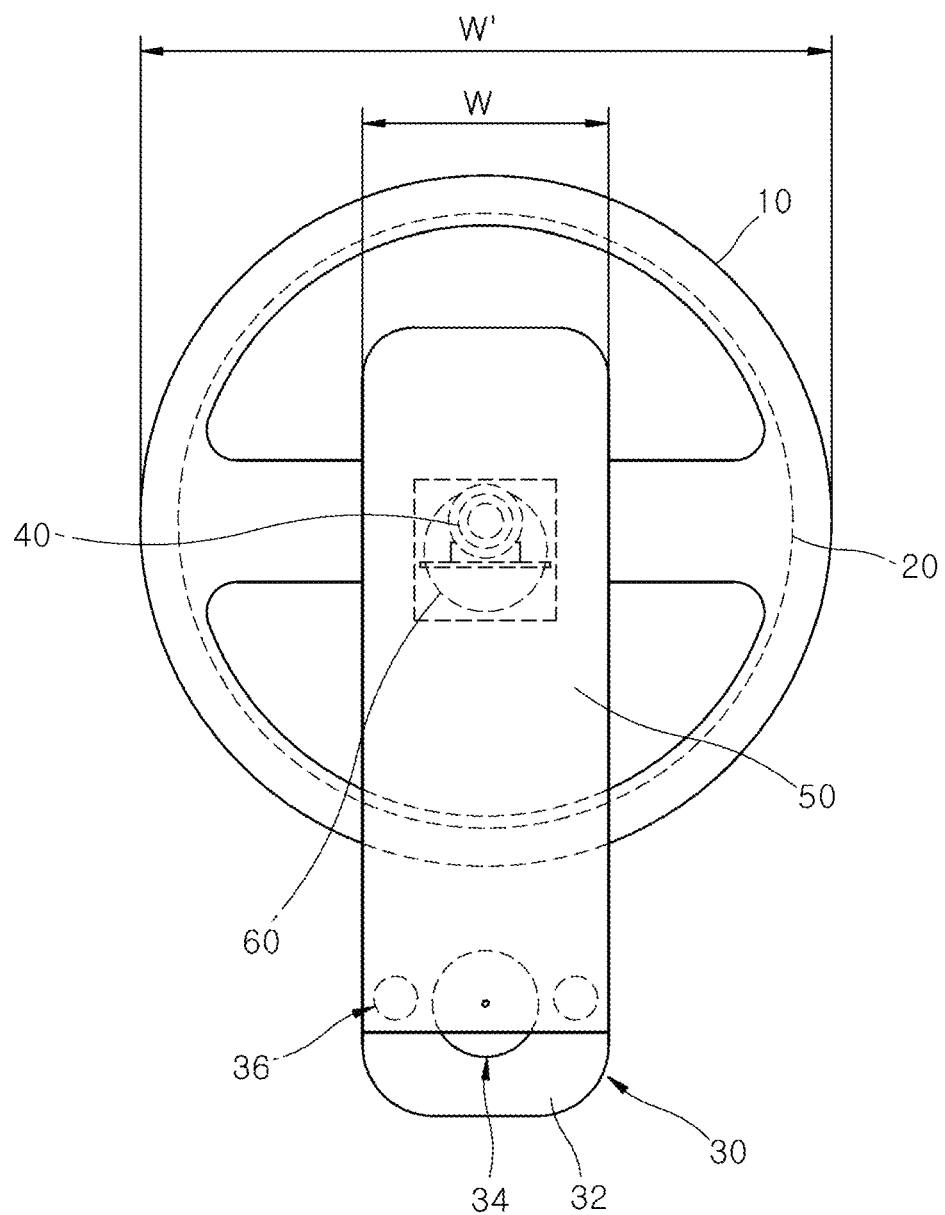

FIG. 1 is a perspective view schematically illustrating the appearance of an air bag device for a driver's seat in accordance with an embodiment of the present invention, FIG. 2 is a view schematically illustrating the main configuration of the air bag device for the driver's seat in accordance with the embodiment of the present invention, FIG. 3 is a view illustrating a connecting relation between a guide chamber and a sub-cushion unit in accordance with an embodiment of the present invention, and FIGS. 4 and 5 are plan views schematically illustrating a state before the guide chamber and the sub-cushion unit in accordance with the embodiment of the present invention are deployed.

As illustrated in FIGS. 1 to 3, the air bag device 1 for the driver's seat in accordance with the embodiment of the present invention includes a main-cushion unit 20 provided on a steering wheel 10 and having a front chamber 22 that comes into contact with the steering wheel 10 and a rear chamber 24 that faces a driver, a sub-cushion unit 30 protruding outwards from the main-cushion unit 20 to communicate with the main-cushion unit 20 and deployed between a side of the steering wheel 10 and a driver, and a guide chamber 50 located in the main-cushion unit 20 to define a passage for guiding gas produced in an inflator 40 to the sub-cushion unit 30.

The main-cushion unit 20 may be formed in various shapes as long as it is provided on the steering wheel 10 and has the front chamber 22 that comes into contact with the steering wheel 10 and the rear chamber 24 that faces a driver.

The main-cushion unit 20 is made by connecting the front chamber 22 with the rear chamber 24 through sewing, and is deployed to an upper side of the steering wheel 10, thus preventing a driver's upper body from coming into contact with the steering wheel 10. The main-cushion unit 20 is supplied with gas through the guide chamber 50 and the sub-cushion unit 30 to be inflated, or is supplied with only gas passing through the sub-cushion unit 30 to be inflated, thus protecting a driver's head and chest.

The front chamber 22 is connected at an edge thereof with the rear chamber 24 through sewing, and is installed to face the steering wheel 10. The rear chamber 24 is a panel coming into contact with a driver, and is deployed to the upper side of the steering wheel 10.

The main-cushion unit 20 in accordance with the embodiment is deployed to the upper side of the steering wheel 10, and the sub-cushion unit 30 is deployed downwards from the edge of the main-cushion unit 20 facing a driver to face an outer surface of the steering wheel 10.

That is, the sub-cushion unit 30 is deployed downwards from a 6 o'clock direction (downward direction when seen in FIG. 3) of the main-cushion unit 20 to cover a side of the steering wheel 10. Thus, even if a position of the steering column is changed due to a head-on collision of a vehicle, the sub-cushion unit 30 covers the side of the steering wheel 10, thus preventing a driver from colliding with the steering wheel 10.

The sub-cushion unit 30 protrudes outwards from the main-cushion unit 20 to communicate with the main-cushion unit 20, and may be formed in various shapes as long as the cushion is formed to be deployed between the side of the steering wheel 10 and a driver.

The sub-cushion unit 30 is a chamber that is installed separately from the main-cushion unit 20, and serves to prevent a driver's chest of a commercial vehicle from coming into contact with the steering wheel 10. The sub-cushion unit 30 is configured to directly cover a lower end of the steering wheel 10, and is supplied with gas to be inflated prior to the main-cushion unit 20.

Therefore, the air bag device 1 for the driver's seat provides the sub-cushion unit 30 that may cover the lower end of the steering wheel 10 with a cushion at an initial stage of an operation of the inflator 40, thus preventing or reducing a driver's injury.

The sub-cushion unit 30 in accordance with the embodiment includes a sub-cushion body 32, a first passage 34, and a second passage 36.

The sub-cushion body 32 protrudes outwards from the main-cushion unit 20, and is inflated by gas to cover the side of the steering wheel 10 facing a driver. The sub-cushion body 32 defines a rectangular chamber and protrudes outwards from the main-cushion unit 20.

The first passage 34 is located between the sub-cushion body 32 and the guide chamber 50 to define a passage for guiding gas that flows through the guide chamber 50 to the sub-cushion body 32. The first passage 34 is located at an upper side of the sub-cushion body 32, and has a hole communicating with a side of the guide chamber 50. Thus, after gas produced in the inflator 40 inflates the guide chamber 50 and flows along the guide chamber 50, the gas flows through the first passage 34 into the sub-cushion body 32. The first passage 34 has a hole through which gas flows in the shape of a membrane shielding the upper side of the sub-cushion body 32.

The second passage 36 connects the sub-cushion body 32 with the main-cushion unit 20, and defines a passage for guiding gas, which flows to the sub-cushion body 32 and inflates the sub-cushion body 32, to the main-cushion unit 20. Since the second passage 36 is installed at each of both sides of the first passage 34, gas that has inflated the sub-cushion body 32 is guided to be rapidly moved to the main-cushion unit 20. The second passage 36 covers the upper side of the sub-cushion body 32, and has a hole for moving gas.

The inflator 40 is installed in the guide chamber 50. If the inflator 40 is installed at an outer side of the guide chamber 50, a separate passage is provided to first supply gas produced in the inflator 40 to the guide chamber 50.

The guide chamber 50 may be formed in various shapes as long as it is located in the main-cushion unit 20 and defines a passage for guiding gas produced in the inflator 40 to the sub-cushion unit 30. The guide chamber 50 is installed in the main-cushion unit 20 for the initial deployment of the sub-cushion unit 30. The guide chamber 50 in accordance with the embodiment defines a separate passage that collects the initial gas flow of the inflator 40 and then causes gas to flow towards the lower end of the steering wheel 10, and has a preset width, length, and position to guide gas to the sub-cushion unit 30.

The guide chamber 50 for guiding the gas of the inflator 40 to the main-cushion unit 20 or the sub-cushion unit 30 that are on the lower end of the steering wheel 10 has a structure for guiding a gas flow in a predetermined direction. The guide chamber 50 defining the passage which is inflated in a linear direction so that gas flows is secured to the front chamber 22, and defines a passage connecting the inflator 40 with an inlet of the sub-cushion unit 30.

Although all of the gas passing through the guide chamber 50 may be supplied to the sub-cushion unit 30, some of the gas passing through the guide chamber 50 in consideration of damage to the guide chamber 50 may first flow into the main-cushion unit 20. Since a separate discharge hole is formed in a side of the guide chamber 50 and some of the flowing gas is supplied to the main-cushion unit 20, damage to the guide chamber 50 is prevented due to the rapid inflation of the guide chamber 50.

Meanwhile, as illustrated in FIG. 4, the guide chamber 50 is formed to be long in a vertical direction, and upper and lower portions of the guide chamber have different lengths with respect to a horizontal central line of the steering wheel 10. A first reference length A' is a length extending from the central line to the upper end of the steering wheel 10, while a second reference length B' is a length extending from the central line to the lower end of the steering wheel 10. Thus, the sum of the first reference length A' and the second reference length B' is equal to a diameter of the steering wheel 10.

A first length A is a length extending from the central line to the upper end of the guide chamber 50, while a second length B is a length extending from the central line to the lower end of the sub-cushion unit 30.

Here, the first length A should be less than the first reference length A'. The reason is because the flow of gas coming from the inflator 40 should be rapidly guided to the lower end of the steering wheel 10 at an initial stage. If the first length A is longer than the first reference length A', space in which gas may be collected during the emission of the gas is created, so that the guide chamber 50 may be damaged due to high pressure, and gas pressure that should flow towards the lower end of the guide chamber 50 may be dispersed.

The reason why the second length B should be longer than a second reference length B' is because the sub-cushion unit 30 is located at the lower end of the steering wheel 10.

A sub-cushion central length C that is a length between the horizontal central line of the steering wheel 10 and a center of the first passage 34 is formed to be longer than the second reference length B'. The sub-cushion central length C should be determined in consideration of a length to which the main-cushion unit 20 and the guide chamber 50 are installed along a curvature of the upper side of the steering wheel 10.

As illustrated in FIG. 5, a chamber width W that is a width of the guide chamber 50 is less than a wheel width W' that is a diameter of the steering wheel 10. The chamber width W should be generally larger than the diameter of the inflator 40. However, if there is no proper gap, the guide chamber 50 may be damaged during the deployment. Furthermore, if a gap between the inflator 40 and the guide chamber 50 is too large, an initial deployment speed of the guide chamber 50 may become low. Therefore, the chamber width W should be 10 mm larger than the diameter of the inflator 40, and should be less than ½ of the wheel width W' so as to guide gas to the sub-cushion unit 30 in an initial operation stage of the inflator 40 and prevent the guide chamber 50 from being damaged.

Meanwhile, as illustrated in FIGS. 1 to 3, the air bag device 1 for the driver's seat in accordance with the embodiment may further include a tether part 60. The tether part 60 has a band shape, and connects the front chamber 22 with the rear chamber 24 to deploy the main-cushion unit 20 in a preset shape. Since the tether part 60 controls the deployment of the main-cushion unit 20, it is possible to prevent a driver from being injured due to excessive inflation of the main-cushion unit 20.

The tether part 60 in accordance with the embodiment includes a central tether 62 connected to the rear chamber 24, and a side tether 64 connecting the central tether 62 with the front chamber 22. Since the central tether 62 is connected to the center of the rear chamber 24 and side tethers 64 extending from both sides of the central tether 62 are connected to the front chamber 22, it is possible to control the deploying shape of the main-cushion unit 20.

Hereinafter, an operation of the air bag device 1 for the driver's seat in accordance with the embodiment of the present invention will be described in detail with reference to the accompanying drawings.

Since the commercial vehicle is short in front overhang, the steering column may be excessively tilted up in the event of a head-on collision. While the steering column equipped with the air bag device 1 for the driver's seat is tilted up at 20 degrees or more, the main-cushion unit 20 is deployed towards the upper side of the steering wheel 10. However, the sub-cushion unit 30 is deployed between a driver's chest and the steering wheel 10 before the main-cushion unit 20 is deployed, thus protecting a driver's upper body.

To this end, in the event of the vehicle collision, gas produced in the inflator 40 inflates the guide chamber 50 while passing through the guide chamber 50. Gas passing through the guide chamber 50 is supplied through the first passage 34 to the sub-cushion body 32, thus inflating the sub-cushion unit 30.

Furthermore, gas flowing through the second passage 36 to the main-cushion unit 20 inflates the main-cushion unit 20, thus preventing or reducing a driver's injury.

Furthermore, all of the gas passing through the guide chamber 50 may flow towards the sub-cushion unit 30, and some of the gas passing through the guide chamber 50 may be supplied to the main-cushion unit 20 in consideration of damage to the guide chamber 50.

When the guide chamber 50 guiding high-temperature and high-pressure gas of the inflator 40 is connected to only the sub-cushion unit 30, the guide chamber 50 may not withstand the gas pressure and may be damaged. Therefore, a hole through which gas flows from the guide chamber 50 to the main-cushion unit 20 is separated from a hole through which gas is supplied from the guide chamber 50 to the sub-cushion unit 30. In the case of having only the hole through which gas flows from the guide chamber 50 to the main-cushion unit 20, the sub-cushion unit 30 is not rapidly deployed, thus increasing a driver's injury.

Therefore, the air bag device 1 for the driver's seat is operated such that gas produced in the inflator 40 through the guide chamber 50 connected with the sub-cushion unit 30 primarily inflates the sub-cushion unit 30 and then secondarily inflates the main-cushion unit 20, thus rapidly covering the outer side of the steering wheel 10 and preventing or reducing a driver's injury by the steering wheel 10.

As described above, in accordance with the present invention, it is possible to prevent or reduce a driver's injury caused by contact between a driver and the steering wheel 10, due to the sub-cushion unit 30 deployed between the steering wheel 10 and a driver's chest in the event of a head-on collision of a vehicle. Furthermore, gas generated in the inflator 40 flows through the guide chamber 50 to primarily deploy the sub-cushion unit 30, and then flows to the main-cushion unit 20 to secondarily deploy the main-cushion unit 20, thus preventing an injury from increasing while a driver's chest coming into contact with the steering wheel 10.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An air bag device comprising:
   a main-cushion unit provided on a steering wheel, and comprising a front chamber that comes into contact with the steering wheel and a rear chamber that faces a driver's seat;
   a sub-cushion unit communicating with the main-cushion unit, and protruding outwards from the main-cushion unit; and
   a guide chamber located in the main-cushion unit to define a passage for guiding gas produced in an inflator to the sub-cushion unit,
   wherein the main-cushion unit is configured to deploy to an upper side of the steering wheel, and the sub-cushion unit is configured to deploy downwards from an edge of the main-cushion unit facing the driver's seat to face an outer surface of the steering wheel.

2. The air bag device of claim 1, wherein the sub-cushion unit comprises:
   a sub-cushion body protruding outwards from the main-cushion unit and configured to be inflated by gas;
   a first passage located between the sub-cushion body and the guide chamber to define a passage for guiding gas to pass through the guide chamber to the sub-cushion body; and
   a second passage connecting the sub-cushion body with the main-cushion unit for guiding gas, which flows to the sub-cushion body and inflates the sub-cushion body, to the main-cushion unit.

3. The air bag device of claim 2, wherein the first passage comprises a hole through which gas flows in a shape of a membrane shielding an upper side of the sub-cushion body.

4. The air bag device of claim 2, wherein the second passage is provided on each of both sides of the first passage.

5. The air bag device of claim 4, wherein the second passage covers the upper side of the sub-cushion body, and has a hole through which gas flows.

6. The air bag device of claim 1, wherein the guide chamber defines a passage connecting the inflator with an inlet of the sub-cushion unit, and is secured to the front chamber.

7. The air bag device of claim 6, wherein the guide chamber comprises a discharge hole formed to supply gas to the main-cushion unit.

8. The air bag device of claim 1, further comprising:
   a tether part formed in a shape of a band, and connecting the front chamber with the rear chamber to guide deployment of the main-cushion unit in a preset shape.

9. An air bag device comprising:
   a main-cushion unit provided on a steering wheel, and comprising a front chamber that comes into contact with the steering wheel and a rear chamber that faces a driver's seat;
   a sub-cushion unit communicating with the main-cushion unit, and protruding outwards from the main-cushion unit; and
   a guide chamber located in the main-cushion unit to define a passage for guiding gas produced in an inflator to the sub-cushion unit,
   wherein the guide chamber is formed to extend along a vertical direction, and upper and lower portions of the guide chamber have different lengths with respect to a horizontal central line of the steering wheel.

10. The air bag device of claim 9, wherein a chamber width that is a width of the guide chamber is less than a wheel width that is a diameter of the steering wheel.

* * * * *